United States Patent
Hintenlang

[11] Patent Number: 6,062,571
[45] Date of Patent: May 16, 2000

[54] RADIAL SHAFT SEALING RING

[75] Inventor: Günter Hintenlang, Absteinach, Germany

[73] Assignee: Firma Carl Freudenberg, Weinheim, Germany

[21] Appl. No.: 09/004,840

[22] Filed: Jan. 9, 1998

[30] Foreign Application Priority Data

Mar. 19, 1997 [DE] Germany ................. 197 11 400

[51] Int. Cl.[7] .................. F16J 15/12; F16J 15/32
[52] U.S. Cl. .................. 277/551; 277/572; 277/573
[58] Field of Search .................. 277/549, 572, 277/573, 575, 551, 565

[56] References Cited

U.S. PATENT DOCUMENTS

| | | | |
|---|---|---|---|
| 2,105,871 | 1/1938 | Vigne | 277/572 X |
| 3,843,139 | 10/1974 | Messenger | 277/573 |
| 4,125,266 | 11/1978 | Schonherr et al. | 277/573 X |
| 4,156,531 | 5/1979 | Boucquey | 277/573 |
| 4,928,980 | 5/1990 | Deuring | 277/572 X |
| 4,949,981 | 8/1990 | Nagashima | 277/549 X |
| 5,018,750 | 5/1991 | Sparks et al. | 277/551 X |
| 5,167,419 | 12/1992 | Robertson | 277/573 X |
| 5,299,677 | 4/1994 | Caillaud et al. | 192/115 |
| 5,368,397 | 11/1994 | Freiwald | . |

FOREIGN PATENT DOCUMENTS 0 579 869   1/1994   European Pat. Off. .

*Primary Examiner*—Anthony Knight
*Attorney, Agent, or Firm*—Kenyon & Kenyon

[57] ABSTRACT

A radial shaft sealing ring has at least one dynamically stressed first seal and at least one statically stressed second seal. The first and second seals are connected to a support ring having a centering seat that is placeable into a housing bore. The support ring has an axial projection which at least partially covers the second seal so as to limit its elastic deformation, and may further contact a housing to be sealed.

13 Claims, 1 Drawing Sheet

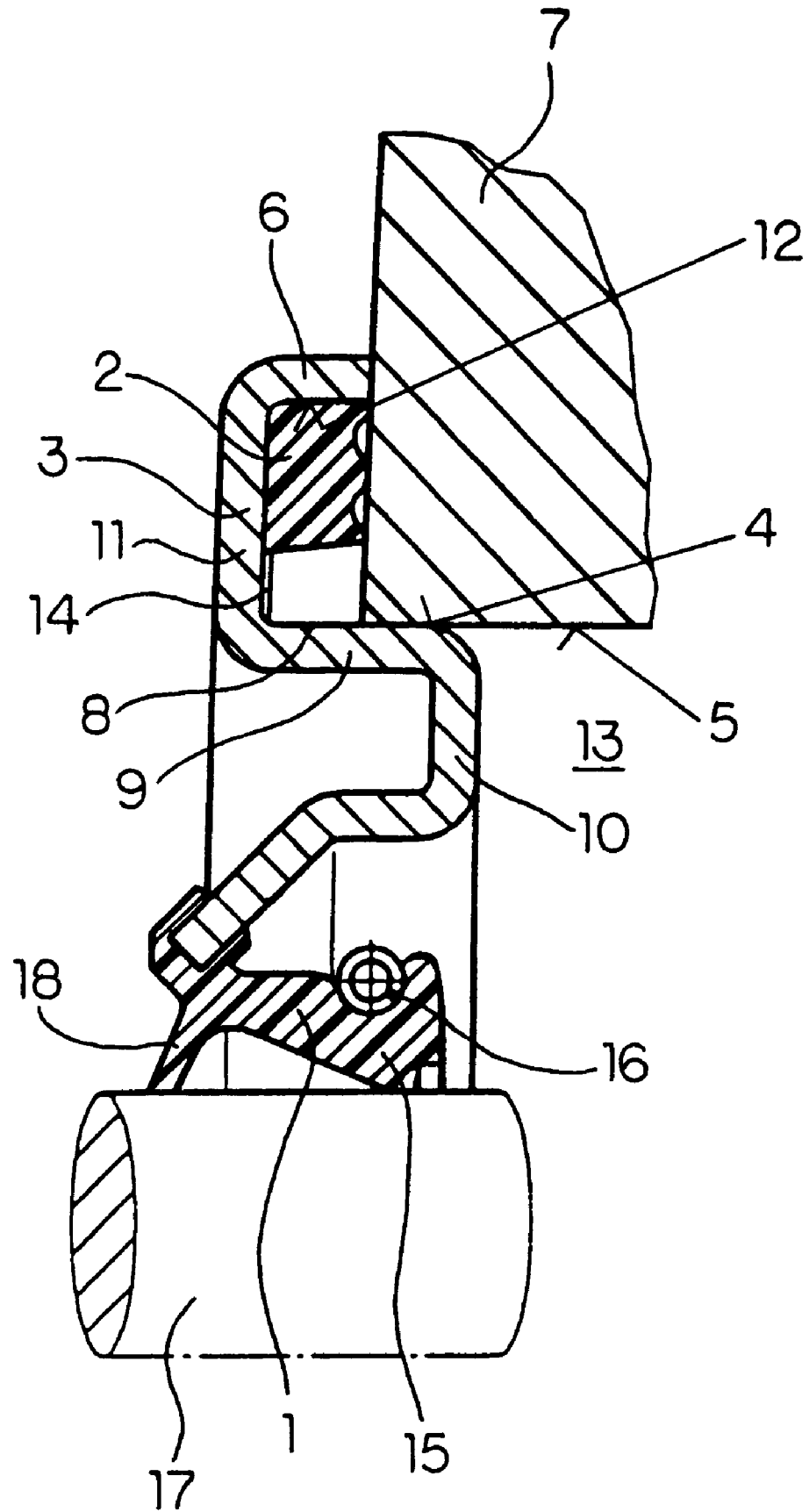

RADIAL SHAFT SEALING RING

BACKGROUND OF THE INVENTION

The present invention relates to a radial shaft sealing ring of the type comprising at least one dynamically stressed first seal and at least one statically stressed second seal, connected to one another by a support ring. The support ring can be placed in a housing bore with a centering seat.

A radial shaft sealing ring is disclosed in European Patent 0 579 869 B1 (the contents of corresponding U.S. Pat. No. 5,368,397 are incorporated herein by reference). The radial shaft sealing ring is integrated in a guide sleeve for the clutch release stop of a gear. The first and second seals are designed in one piece and fastened to the support ring. The clutch guide sleeve has an axial projection situated radially on the outside, which completely covers the stressed second seal. The protection of the second seal, for example, against mechanical overstress, is dependent upon on the design of the axial projection of the clutch guide sleeve.

SUMMARY OF THE INVENTION

An object of the present invention is to further develop a radial shaft sealing ring as mentioned above so that the second seal is supported by the radial shaft sealing ring itself, independently of the design of the housing in which it is fastened.

In the present invention, a radial shaft sealing ring is provided for sealing a shaft with respect to a housing bore. The sealing ring has at least one dynamically stressed first seal and at least one statically stressed second seal. These seals are connected via a support ring having a centering seat along which the ring is seated with respect to the housing bore. The support ring has an axial projection that at least partially covers the second seal so as to limit the elastic deformation of the second seal, and which can be placed on the housing to be sealed. It is advantageous that the support ring on which the first and second seal are placed has such an axial projection for the protection of the second seal, as this arrangement protects the second seal against external influences and mechanical overload independently of the design of the housing.

The support ring is preferably made of a tough and hard material. In the preferred embodiment, the support ring is made of a deep-drawn sheet. It is beneficial that this be made of a non-creeping material to assure that its position over the centering seat in relation to the housing remains unchanged during its entire service life. The use of a support ring made of metallic material is particularly advantageous with regard to the ease of manufacture of the radial shaft sealing ring. Materials other than metallic materials may also be used for the support ring. For example, polymeric materials may be used as long as they have minimal relaxation under load over a long service life.

The support ring preferably has an essentially S-shaped cross section. The centering seat preferably is formed by the external circumferential surface of the axial web connecting the radial web of the support ring. A support ring of such design can be easily and economically manufactured from a deep-drawing sheet. No additional labor- and cost-intensive processing of the centering seat is needed.

The first and second seals can be made of different elastomeric materials separately applied on the support ring. This is advantageous in that it allows for the optimization of the choice o-f material for each seal in dependence upon the specific application at hand. Alternatively, the first and second seals can be made of the same elastomeric material for simplified manufacturing of the radial shaft sealing ring. In order to further simplify the manufacture of the radial shaft sealing ring, the two seals can also be made of the same elastomeric material and designed, for example, in one piece.

The second seal can have an essentially rectangular cross section and be adhesively bonded with the internal circumferential surface of the axial projection and with the side of the radially outer web facing the space to be sealed. Preferably both seals are vulcanized onto the support ring. As a result of such a design, the second seal is completely surrounded by the support ring on the side facing away from the housing and is therefore well protected from external influences.

BRIEF DESCRIPTION OF THE DRAWING

The FIGURE shows a partial cross-sectional view of an embodiment of a radial shaft sealing ring constructed according to the principles of the invention.

DETAILED DESCRIPTION

The FIGURE depicts an embodiment of a radial shaft sealing ring having a centering seat 4 along which it is pressed into a bore 5 of a housing 7. The radial shaft sealing ring has a dynamically stressed first seal 1 and a statically stressed second seal 2. The first seal 1 has a sealing lip 15 that is pressed, in the radial direction, onto the shaft 17 to be sealed, by an annular coiled spring 16, and sealingly surrounds the shaft with a degree of radial prestressing. On the side of the sealing lip 15 facing space 13 to be sealed, there is arranged an additional seal 18, made in one piece with and of the same material as the sealing lip 15 and forming part of the first seal 1.

The second seal 2 is provided, on its side facing housing 7, with an undulation running in the radial direction, i.e., elevations and the depressions adjacent on both sides in the radial direction having an annular shape in the circumferential direction. Such a design is of advantage where, as in the exemplary embodiment, the elastomeric material is incompressible, as it then permits this elastomeric material to retreat into the depressions when deformed, thus avoiding bending/compression stresses that might result in the detachment of the second seal 2 from support ring 3.

On the radially exterior surface of the support ring 3 is an axial projection 6, which is in contact with housing 7 when the radial shaft sealing ring is mounted. Axial projection 6 protects the second seal 2 against mechanical, external influences and an unadmissibly high compression stress in the axial direction during and after the assembly of the radial shaft sealing ring on housing 7. When the second seal 2 is elastically prestressed with a predefined force, axial projection 6 contacts housing 7, thus preventing the second seal 2 from being further deformed to an excessive degree, which would shorten its service life. Therefore, the second seal 2 properly seals the medium to be sealed for a very long service life.

In the illustrated embodiment, the support ring 3 is made of a deep-drawn sheet and has a basically S-shaped cross-section. Centering seat 4 is formed by the external circumferential surface 8 of axial web 9, with axial web 9 connecting the two radial webs 10, 11 of the support ring 3. The second seal 2 is bonded to the radially inwardly facing circumferential surface 12 of axial projection 6, and also to the side 14 facing the space 13 to be sealed of the radially external radial web 11, by vulcanization.

What is claimed is:

1. A radial shaft sealing ring for sealing a shaft with respect to a housing bore of a housing to be sealed, comprising:
   at least one first seal capable of being configured to operate under a dynamic stress;
   at least one second seal capable of being configured to operate under a static stress in accordance with a predefined force exerted in a first direction; and
   a support ring for connecting the first seal to the second seal, the support ring having a centering seat for providing a fastenable contact to the housing bore, the support ring further having an axial projection which extends along the first direction to the housing and which at least partially covers the second seal in order to prevent an additional force exerted in the first direction from producing an additional elastic deformation of the second seal by serving as a limit stop with respect to the housing to be sealed.

2. A radial shaft sealing ring as set forth in claim 1, wherein the support ring is made of a tough and hard material.

3. A radial shaft sealing ring as set forth in claim 1, wherein the support ring has an essentially S-shaped cross-section.

4. A radial shaft sealing ring as set forth in claim 2, wherein the support ring has an essentially S-shaped cross-section.

5. A radial shaft sealing ring as set forth in claim 1, wherein the support ring comprises a radially inner web connected to a radially outer web via an axially extending web having an outer surface that also serves as the centering seat.

6. A radial shaft sealing ring as set forth in claim 1, wherein the first and second seals are made from different elastomeric materials applied separately onto the support ring.

7. A radial shaft sealing ring as set forth in claim 5, wherein the first and second seals are made from different elastomeric materials applied separately onto the support ring.

8. A radial shaft sealing ring as set forth in claim 5, wherein the second seal has an essentially rectangular cross-section and is adhesively bonded to an internal circumference of the axial projection and to a side of the radially outer web facing a space to be sealed.

9. A radial shaft sealing ring as set forth in claim 1, wherein the first direction is parallel to an axis of the shaft.

10. A radial shaft sealing ring as set forth in claim 1, wherein the axial projection cooperates with the centering seat to at least partially cover the second seal.

11. A radial shaft sealing ring as set forth in claim 1, wherein a first side of the second seal is shaped according to a plurality of undulations.

12. A radial shaft sealing ring as set forth in claim 11, wherein:
   the first side of the second seal faces the housing, and
   the plurality of undulations extend along the first side of the second seal in a radial direction with respect to the shaft.

13. A radial shaft sealing ring as set forth in claim 1, wherein:
   the support ring defines a cavity bounded by the axial projection and the centering seat, the second seal being disposed within the cavity and in contact with the housing.

* * * * *